Feb. 25, 1964 S. GOLD ETAL 3,122,446
PROCESS FOR MAKING REMOISTENABLE ADHESIVE COATINGS
AND PRODUCTS RESULTING THEREFROM
Filed April 18, 1961

FIG. 1

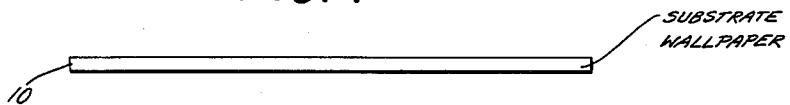

SUBSTRATE
WALLPAPER

FIG. 2

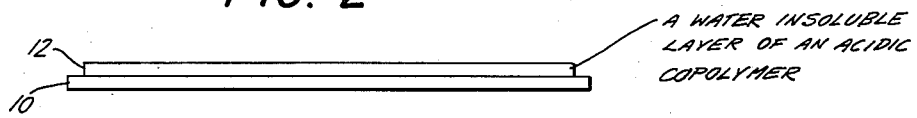

A WATER INSOLUBLE
LAYER OF AN ACIDIC
COPOLYMER

FIG. 3

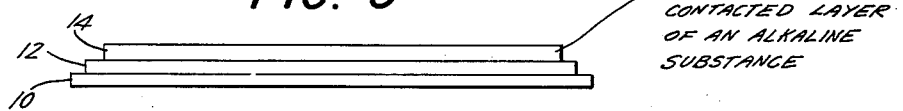

AN ADDED OR
CONTACTED LAYER
OF AN ALKALINE
SUBSTANCE

FIG. 4

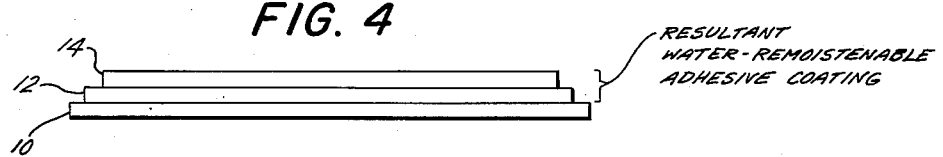

RESULTANT
WATER-REMOISTENABLE
ADHESIVE COATING

INVENTORS
SAMUEL GOLD
CARL D. MAROTTA
MATTHEW A. KUCLAR
BY
James K. Franklin
ATTORNEYS United States Patent Office 3,122,446
Patented Feb. 25, 1964

3,122,446
PROCESS FOR MAKING REMOISTENABLE ADHESIVE COATINGS AND PRODUCTS RESULTING THEREFROM
Samuel Gold, Berkeley Heights, and Carl D. Marotta, Bound Brook, N.J., and Matthew A. Kucler, Kenmore, N.Y., assignors of one-half to National Starch and Chemical Corporation, New York, N.Y., a corporation of Delaware, and of one-half to Birge Company, Inc., Buffalo, N.Y., a corporation of New York
Filed Apr. 18, 1961, Ser. No. 103,704
10 Claims. (Cl. 117—62.1)

This invention relates to a process for making water-remoistenable adhesive coatings, and to the products thus produced. It is our object to apply coatings upon surfaces such as paper, synthetic and natural fabrics, leather or any other surfaces where an adhesive is required, such that when the dry coating is moistened with water it will be reactivated to a powerfully adhesive state and be capable of being bonded to another surface by mere application of manual pressure. It is our further object to provide wall coverings bearing such a coating on the reverse side thereof, so that the coated surface need merely be moistened before bonding the coverings to walls. Another object is to provide remoistenable adhesive labels, stamps, envelopes, tapes and similar objects. Still another object is to deposit such coatings from aqueous dispersions containing substantially higher solids than heretofore feasible, thus making it unnecessary to evaporate as much water from the deposited film, and resulting in dried coatings of improved dimensional stability and increased resistance to blocking under humid conditions.

Water-remoistenable adhesive coatings have long been made by applying aqueous dispersions of hydrocolloids such as dextrine, starch, various natural gums, methyl cellulose, carboxy methyl cellulose and the like. These substances, being water soluble, at least to a colloidal state, form films which become reactivated to an adhesive state upon moistening with water. However, the use of such substances is attended by at least one serious disadvantage. When dissolving hydrocolloids in water, the viscosity of the resultant solution rapidly reaches a point where the addition of any further amount of the hydrocolloid to the solution causes the viscosity to be too great for feasible application on the desired surface. In other words, there is a quite definite limit to the amount of adhesive solids that can be present in the aqueous adhesive dispersion, to permit coating a film on the wall covering, label, stamp or other surface. Since the amount of adhesive solids in a given area of adhesive coating is directly related to the ultimate adhesive "grab" or power of the coating when the latter is remoistened, as well as to other commercially important factors such as dimensional stability and speed of drying, it is seen that low adhesive solids in the coating composition can often be a serious drawback. An adhesive coating containing higher solids has long been sought, but heretofore without practical success.

We have now devised a process whereby it is possible to obtain water-remoistenable adhesive coatings characterized by higher adhesive solids content and by greater adhesive strength than has heretofore been obtainable.

Our process consists essentially of this application, to the surface, of a water-insoluble resin copolymer wherein at least one of the monomers comprising said copolymer is an acid. Representative examples of such acidic copolymers will be set forth subsequently. This acidic copolymer, in the form of an aqueous dispersion or as a lacquer (i.e. solution in an organic solvent) is coated upon the paper or other surface upon which it is desired to apply the adhesive coating. Either while the said coating is still partially wet, or after it has dried, we bring said coating into contact with an alkaline substance, such as an alkali metal hydroxide, an alkali metal salt of a weak acid, ammonia, or other basic material. It has been found that the coating of resinous copolymer, thus treated "in situ" with alkali is not only immediately adhesive, but even after it has been permitted to dry it can readily be reactivated to an adhesive, tacky condition by mere remoistening with water. In other words, the film has been made water-remoistenable.

The contacting of the resinous coating with the alkaline substance may be effected in several ways. Thus, by one means, an aqueous alkaline solution is simply applied on top of the resinous coating. The thus alkalized resinous film may be adhered at once to another surface, or it may be permitted to dry, and remoistened with water at such time as it is necessary to reactivate it to an adhesive state.

By another means, the material (paper, cloth, etc.) coated with the copolymer film is passed through a bath comprising an aqueous solution of an alkaline substance. The effect is the same as indicated above.

By still another method, the substrate (paper, cloth, etc.) is first coated with an alkaline material and subsequently the resinous copolymer is coated on top of the said alkaline coating. In practice, in order to avoid excessive penetration of the alkaline substance into the substrate, the alkaline substance is applied in the form of a "hold-out" coating. This involves the use of the alkali in the form of an aqueous solution which also contains a starch or other thickener, which serves to retain the alkaline coating on the surface of the substrate. It is seen that this method is similar, in its ultimate effect, to those previously mentioned, that it, there is a contact beween the alkaline subsance and the resinous copolymer, causing the latter to become water-soluble "in situ."

It should be added that when a volatile material such as ammonia is used as the alkaline agent, the water-sensitivity of the resulting treated resinous film is temporary. It will become adhesive immediately upon treatment, and will remain water-remoistenable for a relatively short time thereafter. However, with the passing of time this water-remoistenable characteristic disappears. This is an advantage, sometimes, where adhesion of the coated surface to some other surface (e.g. a wall covering to a wall) is to take place shortly after treatment of the resinous copolymer film with the alkali. Upon aging, the adhesive bond becomes insensitive to water.

The method of our invention is illustrated in the accompanying drawing in which:

FIG. 1 represents a sheet paper substrate 10 such as wallpaper and the like;

FIG. 2 illustrates the application to the substrate 10 of a water-insoluble layer 12 of the acidic copolymer;

FIG. 3 illustrates the addition to or the contacting of the water-insoluble layer 12 with an alkaline substance 14; and FIG. 4 illustrates the resultant product, namely a substrate 10 now having a water-remoistenable adhesive coating 12, 14.

Representative examples of acid copolymers, suitable for use in our invention, include the following:

(1) Copolymers of vinyl acetate and crotonic acid, wherein the weight ratio of vinyl acetate to crotonic acid ranges from 80:20 to 95:5.

(2) Terpolymers of methyl methacrylate, ethyl acrylate and methacrylic acid, as for example the terpolymer containing these monomers in the approximate ratio 40:20:40.

(3) Copolymers of ethyl acrylate and acrylic acid, wherein the ratio of the monomers is from 80:20 to 50:50.

(4) Terpolymers of vinyl acetate, ethyl acrylate and acrylic acid, wherein the ratio of the monomers may be from 10:50:40 to 80:10:10.

Other suitable copolymers will be apparent to the practitioner, remembering that the requirement is that the copolymers be acidic, and that they be insoluble in water.

The copolymers are applied in the form of aqueous dispersions (or "emulsions"—the terms being used interchangeably in the resin art) or as solutions in organic solvents. In either case, the amount of resin solids in the dispersion or solution should preferably be at least 25% by weight. At this point one sees one of the chief advantages of our process, namely, that one applies to the surface a coating containing much higher adhesive solids than the present art. When aqueous solutions of hydrocolloids were employed, in the prior art, it was not ordinarily possible to use a solution containing more than from 2 to 10% solids; anything higher than that proved to be too viscous to be amenable to coating procedures. On the other hand, considerably higher solids content is obtainable, in the form of aqueous emulsions or latices of the water-soluble copolymers, or even their solutions in organic solvents, without undue increase in viscosity. Even when the resinous copolymer dispersion is applied in admixture with a hydrocolloid, as will be explained subsequently, there is still present a substantially higher solids content than was feasible under prior art practices.

The resin copolymer dispersion or solution is coated onto the paper, fabric or other desired surface by any suitable coating means, as for example by brush, spraying, coating rolls or the like.

If the above-mentioned resinous coating were permitted to dry, without further treatment, it would be found that the dried film could not be reactivated to a strongly adhesive state by moistening with water. In order to achieve a water-remoistenable coating, we take the paper or other surface which has been coated with the resinous copolymer, and while the latter is still wet or even after it has dried, we apply over the resin layer a coating of an aqueous solution of sodium hydroxide or other strongly alkaline substance. We prefer, as a matter of convenience, to employ a dilute aqueous solution of sodium hydroxide. The amount of alkali to be coated upon the resin layer will vary, depending upon the thickness of the resin coating, and also upon the particular resin copolymer employed, and more particularly the amount of acid in said copolymer. In general, however, we use the stoichiometric quantity of alkali necessary to neutralize the acid in the copolymer. The alkaline substance can be applied by any suitable means, and as previously stated, it can be applied to the paper before the copolymer coat.

When the alkali-treated resin surface is permitted to dry, and subsequently remoistened with water, it is found that the surface become powerfully adhesive.

Aside from the advantage of greater adhesive strength, due to the use of a resin dispersion in the coating, other advantages are to be noted. Thus, the coated sheet has greater dimensional stability; that is, greater resistance to stretching, curling or distortion. This is believed to be due to the fact that we apply less water to the sheet, since our resin dispersion contains considerably higher solids than the prior art hydrocolloids. Furthermore, we obtain faster drying of the coated sheet, again because of the higher solids as well as the fact that resin latices or emulsions dry more quickly than hydrocolloid solutions. Furthermore, our process is simpler than prior art methods. There are ordinarily no hydrocolloids to be cooked or dissolved. The viscosity of our acidic copolymer dispersion or solution may be readily varied to suit particular coating methods and requirements, by mere pH adjustment.

While the essential principle of our invention is the application of a water-insoluble, acidic copolymer and the contacting of that polymer coat with an alkali, it is possible to combine this principle with prior art methods. More specifically, the coating may consist of a mixture of an acidic copolymer and a conventional hydrocolloid such as starch or the like. Such a coating would still, of course, require the treatment with an alkali in order to solubilize the acidic copolymer component. Coatings formed from mixtures of acidic copolymers and hydrocolloids, treated in situ with alkali, fall within the scope of our invention.

When applying the coating to highly porous substrates, such as paper, it is sometimes found desirable to apply a preliminary coat of a suitable sealant, such for example as an aqueous starch dispersion with an alkali. This serves to prevent undue absorption of the subsequent copolymer dispersion, and to neutralize any residual acidity in the porous substrate. This alkaline undercoat often makes unnecessary the further addition of alkali over the subsequent copolymer coat.

The following examples will further illustrate the embodiment of our invention. All parts are by weight, unless otherwise specified.

*Example I*

An aqueous dispersion of a terpolymer comprising 40% methacrylic acid, 40% methyl methacrylate and 20% ethyl acrylate (28% solids) was coated upon the back of a printed wallpaper. The amount of resin dispersion applied was equivalent to 4 lbs. resin solids per ream of the paper. Before the coating was completely dry, we sprayed it with a 25% aqueous solution of sodium hydroxide, the amount of sodium hydroxide applied being equivalent to 0.5 lb. per ream (this being the stoichiometric equivalent for the acid in this particular copolymer). After being permitted to dry, it was found that mere remoistening with water caused the coating to become tacky and adhesive. The tackiness persisted for a considerable period, and the paper, when pressed with the moistened coated side against a wall, exhibited excellent "slip" properties and adhesion.

*Example II*

An aqueous dispersion of a terpolymer comprising 50% vinyl acetate, 25% acrylic acid and 25% ethyl acrylate (30% solids) was coated onto paper. The coating thickness was equivalent to 6-8 lbs. of resin per ream of paper. When the coating was dry, we applied over the dry coating a 25% solution of potassium hydroxide, the amount of alkali added being equivalent to 0.6 to 0.8 lb. (solid alkali) per ream. When dried and remoistened with water, a powerfully adhesive film was obtained.

*Example III*

A solution of a copolymer of vinyl acetate and crotonic acid (in the monomer ratio 90:10) in ethyl alcohol (45% solids) was coated upon label stock paper, in the amount of 8 to 15 lbs. of resin solids per ream of paper. When substantially dry, the coating was moistened with a 25% aqueous solution of sodium hydroxide in the amount of 0.3 to 0.6 lb. per ream. The dried coating had excellent water-remoistening properties, and the coated paper was particularly suitable for remoistening-type labels. By varying the paper, we were able to produce remoistenable stamps and similar products.

*Example IV*

This example illustrates the use of a mixture of an acidic copolymer and a conventional hydrocolloid. It also illustrates the use of a preliminary base coat to seal the paper and thus prevent undue absorption of the adhesive coat by the paper. In this case we combined the alkaline substance with the preliminary base coat, so that when the acidic copolymer was subsequently applied, the alkaline substance reacted with it to achieve solubilization in situ. Because of the presence of the alkali in the base coat, it was not necessary to apply further alkali over the copolymer coat.

We first prepared a dispersion of 3.5 parts of carboxymethyl starch in 93 parts of water, containing dissolved therein 3.5 parts of sodium carbonate. We applied this to the reverse (i.e. non-printed) side of wallpaper at a coating weight of 1 to 1½ lbs. per ream. To the thus-coated surface, we then applied a coating consisting of a mixture of equal parts of a 10% aqueous dispersion of drum dried waxy maize starch, and a 28% solids dispersion of a terpolymer of methacrylic acid, methyl methacrylate and ethyl acrylate (monomer ratio 40:20:20). The terpolymer was applied in a quantity equivalent to 1 to 1½ lbs. per ream. After drying, the resultant film was readily activated to a powerfully adhesive state by moistening with water.

*Example V*

This example illustrates the coating of paper with a water-insoluble resinous copolymer, drying the coating, and subsequently passing the coated paper through a bath of an aqueous alkaline solution (at the point of use), in order to activate the coating to an adhesive state.

An aqueous dispersion of the resinous copolymer of Example I was coated on one surface of a sheet of paper, and dried. At this point the coating was non-adhesive, and could not be made adhesive by mere moistening with water. Then the coated paper was passed through a bath comprising a 7% solution of sodium bicarbonate in water. The coating was thereupon activated to a powerfully adhesive state, and could immediately be bonded to any other desired object.

*Example VI*

This example illustrates the formation of a water-resistant bond by using a volatile alkali, such as ammonia, to solubilize the resinous copolymer.

A solution of a 90:10 vinyl acetate-crotonic acid copolymer in ethanol was coated upon one surface of paper, and dried. When it was desired to bond the thus-coated paper to another sheet of paper, the coating was moistened with an approximately 3% aqueous solution of ammonia. The coating became adhesively tacky, and was bonded to the other sheet of paper. Portions of the thus-bonded laminate were tested at various intervals for water-sensitivity. It was noted that water-sensitivity decreased with aging. Thus, a sample that had been held at 140° F. for 4 days was completely resistant to water, and the bond could not be separated even after soaking in water.

Summarizing, our process of forming high-solids, water-remoistenable adhesive films upon surfaces comprises taking an aqueous dispersion or an organic solvent solution of a water insoluble copolymer, wherein one of the monomers of said copolymer is an acid, coating the dispersion or lacquer upon the surface; and while the resin coating is still wet or after it has dried, contacting said coating with a strongly basic substance such as sodium hydroxide or sodium carbonate, in an amount substantially equivalent to the stoichiometrical quantity of acid in the copolymer. As already explained, the resinous copolymer may be coated upon an untreated paper, woven or non-woven fabric, synthetic film or other surface, or it may be coated upon a surface which has been pretreated with a "hold-out" coat which may or may not itself contain an alkaline substance. If such a preliminary coat is applied, containing an alkaline substance, and the resinous coating is applied thereupon, the resinous film ordinarily needs no further treatment with alkali, since it will react with the alkali in the bottom coat. Also, as herein indicated, the resinous copolymer may, if desired, be applied in admixture with a hydrocolloid such as starch.

The water-remoistenable coatings of our invention are applicable to wall coverings, adhesive tapes, labels, stamps, cartons, boxes, envelopes, decals or for any other adhesive uses where water-remoistening properties are required.

Variations in materials, proportions and procedures may be made without departing from the scope of the invention, which is limited only by the following claims.

We claim:

1. A method for making a water-remoistenable adhesive coating upon a surface which comprises depositing upon said surface a layer of a water-insoluble, acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, and bringing said deposited layer into contact with an alkaline substance, the amount of said alkaline substance being equivalent to the stoichiometrical quantity of acid in the acidic copolymer.

2. The method of claim 1 in which the acidic copolymer is deposited in the form of an aqueous dispersion.

3. The method of claim 1 in which the acidic copolymer is deposited in the form of a solution in an organic solvent.

4. The method of claim 1 in which the alkaline substance is selected from the class consisting of alkali metal hydroxides and salts of alkali metal hydroxides and weak acids, and ammonia, and in which the amount of said alkaline substnce is equivalent to the stoichiometrical quantity of acid in the acidic copolymer.

5. A method for making a water-remoistenable adhesive coating upon a surface which comprises depositing upon said surface a layer of a water-insoluble, acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, and then depositing upon said copolymer layer a solution of an alkaline substance, the amount of said alkaline substance being equivalent to the stoichiometrical quantity of acid in the acidic copolymer.

6. A method for making a water-remoistenable adhesive coating upon a surface which comprises first applying to said surface a solution of an alkaline substance, and then depositing thereupon a layer of a water-insoluble, acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, the amount of said alkaline substance being equivalent to the stoichiometrical quantity of acid in the acidic copolymer.

7. A method for making a water-remoistenable adhesive coating upon a surface which comprises first coating the surface with a mixture of a water-soluble hydrocolloid and a water-insoluble, acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, and then depositing upon said first coating a solution of an alkaline substance, the amount of said alkaline substance being equivalent to the stoichiometrical quantity of acid in the acidic copolymer.

8. A method for making a water-remoistenable adhesive coating upon a surface which comprises first applying to said surface a solution containing an alkaline substance, and then coating thereupon a mixture of a water-soluble hydrocolloid and a water-insoluble, acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, the amount of said alkaline substance being equivalent to the stoichiometrical quantity of acid in the acidic copolymer.

9. A method for converting a water-insoluble resin copolymer coating into a water-remoistenable adhesive coating which comprises taking a surface having deposited thereon a layer of a water-insoluble, acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, and bringing an alkaline substance into contact with said deposited layer the amount of said alkaline substance being equivalent to the stoichiometrical quantity of acid in the acidic copolymer.

10. A surface coated with a dry film which is reactivatable to an adhesive state when moistened with water, said film comprising a coating of a water-insoluble acidic copolymer selected from the class consisting of copolymers of vinyl acetate and crotonic acid wherein the weight ratio of vinyl acetate to crotonic acid ranges from 80:20 to 95:5, terpolymers of methyl methacrylate, ethyl acrylate and methacrylic acid wherein the monomers are in the approximate weight ratio of 40:20:40, copolymers of ethyl acrylate and acrylic acid wherein the weight ratio of the monomers is from 80:20 to 50:50, and terpolymers of vinyl acetate, ethyl acrylate and acrylic acid wherein the weight ratio of the monomers ranges from 10:50:40 to 80:10:10, said coating reacted in situ with an alkaline substance, the amount of said alkaline substance being equivalent to the stoichiometrical quantity of acid in the acidic copolymer.

References Cited in the file of this patent

UNITED STATES PATENTS

| | | |
|---|---|---|
| 2,137,169 | Levey | Nov. 15, 1938 |
| 2,657,189 | Pinkney | Oct. 27, 1953 |
| 2,976,203 | Young et al. | Mar. 21, 1961 |